US006990657B2

(12) United States Patent  (10) Patent No.: US 6,990,657 B2
Hunter et al.  (45) Date of Patent: Jan. 24, 2006

(54) SHARED SOFTWARE BREAKPOINTS IN A SHARED MEMORY SYSTEM

(75) Inventors: Jeff L. Hunter, Missouri City, TX (US); Mark L. Buser, Green Brook, NJ (US); Bruce W. C. Lee, Richmond Hill (CA); Imtaz Ali, Etobicoke (CA)

(73) Assignee: Texas Instruments Incorporated, Dallas, TX (US)

( * ) Notice: Subject to any disclaimer, the term of this patent is extended or adjusted under 35 U.S.C. 154(b) by 549 days.

(21) Appl. No.: 09/998,756

(22) Filed: Dec. 3, 2001

(65) Prior Publication Data

US 2002/0100024 A1  Jul. 25, 2002

Related U.S. Application Data

(60) Provisional application No. 60/263,804, filed on Jan. 24, 2001, provisional application No. 60/315,748, filed on Aug. 29, 2001.

(51) Int. Cl.
G06F 9/44  (2006.01)

(52) U.S. Cl. .................. 717/129; 717/124; 717/127; 717/149; 711/113; 711/141; 711/147; 711/155

(58) Field of Classification Search .............. 717/124, 717/127, 129, 149; 714/34; 711/147, 150, 711/141, 148, 113, 155; 712/227
See application file for complete search history.

(56) References Cited

U.S. PATENT DOCUMENTS

| | | | | |
|---|---|---|---|---|
| 5,388,242 A | * | 2/1995 | Jewett | 711/113 |
| 5,678,003 A | * | 10/1997 | Brooks | 714/34 |
| 5,680,542 A | * | 10/1997 | Mulchandani et al. | 714/28 |
| 6,011,920 A | * | 1/2000 | Edwards et al. | 717/130 |
| 6,065,078 A | * | 5/2000 | Falik et al. | 710/100 |
| 6,253,293 B1 | * | 6/2001 | Rao et al. | 711/147 |
| 6,263,456 B1 | * | 7/2001 | Boxall et al. | 714/31 |
| 6,480,818 B1 | * | 11/2002 | Alverson et al. | 703/26 |
| 6,658,578 B1 | * | 12/2003 | Laurenti et al. | 713/324 |
| 6,671,825 B1 | * | 12/2003 | Joshi et al. | 714/38 |
| 6,708,326 B1 | * | 3/2004 | Bhattacarya | 717/124 |
| 2002/0104071 A1 | * | 8/2002 | Charisius et al. | 717/109 |

OTHER PUBLICATIONS

Jonathan B. Rosenberg, "How Debuggers Work", 1996, Wiley Computer Publishing, ISBN 0-471-14966-7, Chapters 3 and 13.*

"Code Composer User's Guide", Feb. 1999, Texas Instruments, Lit. No. SPRU296, accessed online at <http://focus.ti.com/lit/ug/spru296/spru296.pdf> on Sep. 24, 2004, Chapters 2-4 and 7.*

Robert Wahbe, "Efficient data breakpoints", Sep. 1992, ACM SIGPLAN Notices , Proceedings of the fifth international conference on Architectural support for programming languages and operating systems, vol. 27 Issue 9, ISBN:0-89791-534-8, p. 200-212.*

(Continued)

*Primary Examiner*—Tuan Dam
*Assistant Examiner*—J. Derek Rutten
(74) *Attorney, Agent, or Firm*—Robert D. Marshall, Jr.; W. James Brady, III; Frederick J. Telecky, Jr.

(57) ABSTRACT

The invention relates to a method for maintaining coherency of software breakpoints in shared memory when debugging a multiple processor system. Using this method, at least two debug sessions associated with processors in the multiple processor system are activated. When a debug sessions sets a software breakpoint in a shared memory location, all active debug sessions are notified that the software breakpoint has been set. And, when a software breakpoint in shared memory is cleared by a debug session, all active debug sessions are notified that the software breakpoint has been removed.

18 Claims, 13 Drawing Sheets

OTHER PUBLICATIONS

Patterson and Hennessy, "Computer Architecture: A Quantitative Approach", 1995, Morgan Kaufmann, 2$^{nd}$ Edition, ISBN 1-55860-329-8, Section 8.3, pp. 654-677.*

Ziya Aral, Ilya Gertner, "High-level debugging in parasight", Nov. 1988, ACM SIGPLAN Notices, Proceedings of the 1988 ACM SIGPLAN and SIGOPS workshop on Parallel and distributed debugging, vol. 24 Issue 1, ISBN: 0-89791-296-9, pp.: 151-162.*

Bannatyne, R., "Debugging aids for systems-on-a-chip", Oct. 1998, Northcon/98 Conference Proceedings, ISBN: 0-7803-5075-8, pp. 159-163.*

Bennett et al. "Munin: distributed shared memory based on type-specific memory coherence", 1990, Proceedings of the second ACM SIGPLAN symposium on Principles & practice of parallel programming, ISBN:0-89791-350-7, pp.: 168-176.*

* cited by examiner

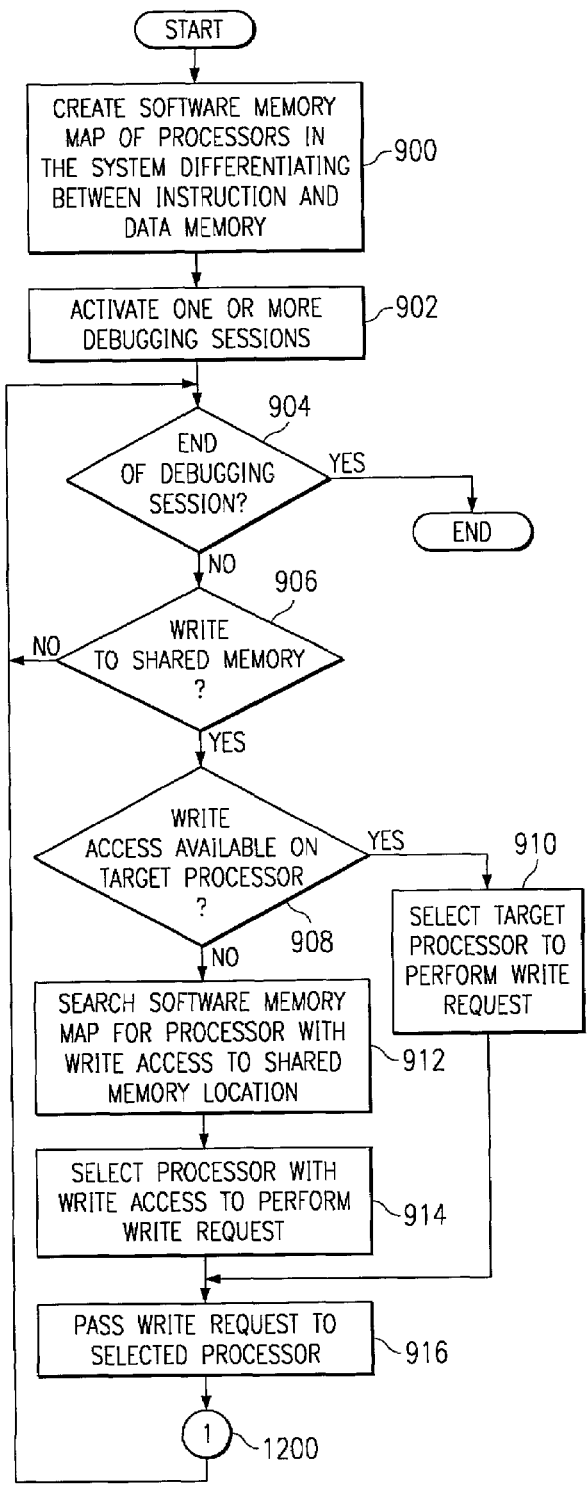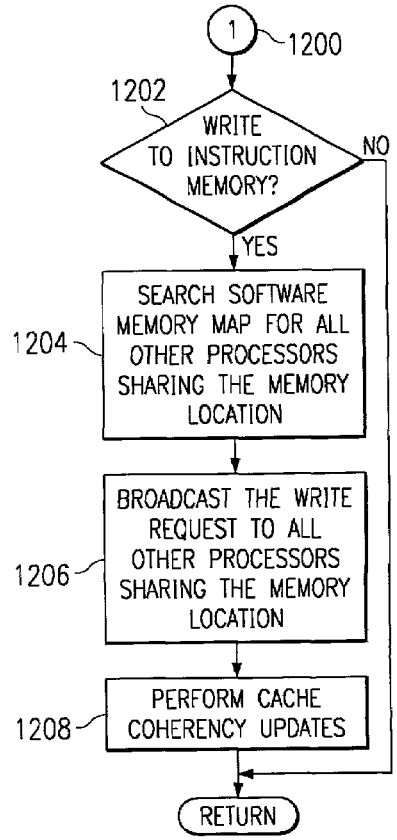
FIG. 12A
FIG. 12B

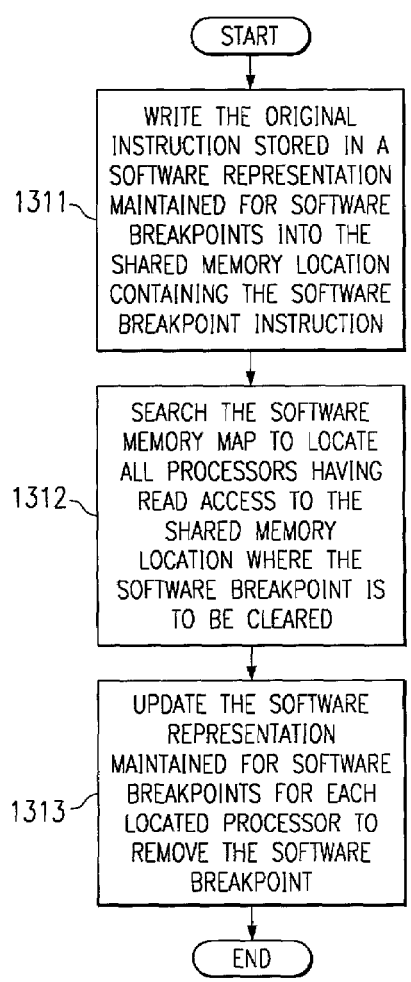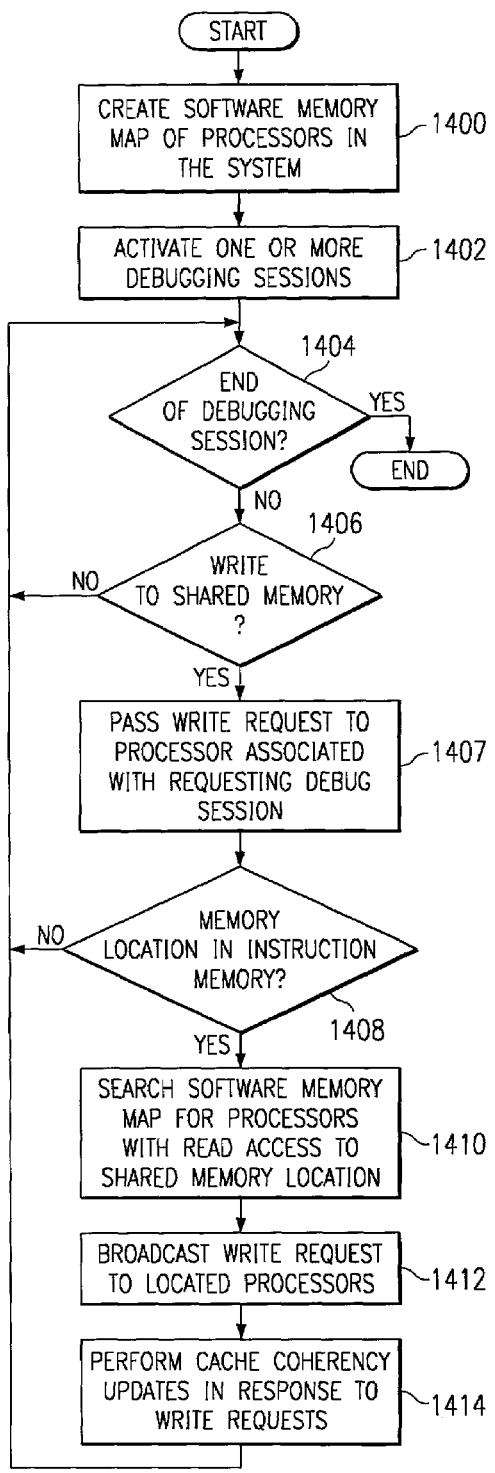

SHARED SOFTWARE BREAKPOINTS IN A SHARED MEMORY SYSTEM

This application claims priority under 35 USC §119(e) (1) of Provisional Application Ser. No. 60/263,804, filed Jan. 24, 2001 and Provisional Application Ser. No. 60/315,748 filed Aug. 29, 2001.

This application is related to and claims priority under 35 USC §119 (e) (1) to Provisional Application Ser. No. 60/263,804, Host Software Assisted Transparent Shared Memory Support For Multiple CPU Embedded Development Systems, filed on Jan. 24, 2001. This application is also related to co-pending applications Ser. No. 60/315,847 Transparent Shared Memory Access in a Software Development System filed Aug. 29, 2001 now U.S. patent application Ser. No. 09/998,755 filed Dec. 3, 2001, Ser. No. 60/315,815 Method for Maintaining Cache Coherency in Software in a Shared Memory System filed Aug. 29, 2001 now U.S. patent application Ser. No. 09/998,330 filed Dec. 3, 2001, and Ser. No. 60/315,843 Software Shared Memory Bus filed Aug. 29, 2001 now U.S. patent application Ser. No. 09/998,329 filed Dec. 3, 2001.

FIELD OF THE INVENTION

This invention generally relates to software development systems, and more specifically to debugging support for embedded software applications executing on multiple processor architectures.

BACKGROUND OF THE INVENTION

The advent of the system-on-a-chip (SOC) architectures for embedded systems has created many challenges for the software development systems used to develop and debug software applications that execute on these architectures. These systems may be comprised of multiple interconnected processors that share the use of on-chip and off-chip memory. A processor may include some combination of instruction cache (ICache) and data cache (DCache) to improve processing performance and can be instantiated from a design library as a single megacell. Furthermore, multiple megacells, with memory being shared among them, may be incorporated in a single embedded system. The processors may physically share the same memory without accessing data or executing code located in the same memory locations or they may use some portion of the shared memory as common shared memory. Common shared memory contains executable code or data that will be accessed or executed by more than one processor, possibly simultaneously.

These multiprocessor systems are often built by combining existing single processors. As a result, these systems often lack the hardware support to properly manage memory accesses and cache coherency while an application is being debugged. To keep the cost per chip low, often the circuitry permitting write access to shared memory may be limited to a subset of the processors sharing that memory. While this limited write access is acceptable when executing a fully debugged application, it is problematic during the development and debugging process. The debug process, by its very nature, requires the ability to download code and data to shared memory, to change code and data when problems are detected, and to set software breakpoints all while maintaining a synchronized view of memory across multiple processors. It is possible to re-tool debugger infrastructure to comprehend such multiprocessor systems but it is expensive to build specialized debuggers for every multiprocessor configuration.

SUMMARY OF THE INVENTION

An illustrative embodiment of the present invention seeks to provide a method for maintaining coherency of software breakpoints in shared memory when debugging a multiple processor system. Using this method, at least two debug sessions associated with processors in the multiple processor system are activated. When a debug sessions sets a software breakpoint in a shared memory location, all active debug sessions are notified that the software breakpoint has been set. And, when a software breakpoint in shared memory is cleared by a debug session, all active debug sessions are notified that the software breakpoint has been removed.

In other embodiments, the method includes a step of creating a software memory map representing the memory usage of the processors in the multiple processor system.

When a software breakpoint is to be set in a shared memory location, the software memory map is searched to locate all processors having read access to that shared memory location. The software representation for software breakpoints maintained for the located processors is updated to reflect that software breakpoint is being set at the shared memory location. Then, the software breakpoint instruction is written to the shared memory location. When a software breakpoint is cleared in shared memory, the original instruction stored in a software representation maintained for software breakpoints is written into the shared memory location. The software memory map is searched to find all processors having read access to the shared memory location and the software breakpoint representation is updated for each located processor to reflect the removal of the software breakpoint.

In another embodiment, the method is enhanced to support multiple processor systems in which all processors do not have write access to shared memory. When the software breakpoint instruction or the original instruction is to be written to shared memory, a check is made to see if the processor associated with the debug session that has requested the write has write access to the shared memory location. If it does, that processor executes the write. If it does not, the software memory map is searched to locate a processor that does have write access to the shared memory location and that processor is used to execute the write.

In another embodiment, the method is enhanced to maintain software breakpoint coherency when stepping over a breakpoint or running after hitting a breakpoint. The software breakpoint in the shared memory location is cleared such that all active debug sessions are notified that the breakpoint has been removed, the processor requesting the step over or resumption of execution is stepped to the instruction following the shared memory location, and the software breakpoint is reset in the shared memory location such that all active debug sessions are notified of the resetting of the breakpoint.

In other embodiments, a software development system is provided that executes the above methods during the debugging of the multiple processor system. And, a digital system is provided that executes the code that is debugged using the above methods.

BRIEF DESCRIPTION OF THE DRAWINGS

Particular embodiments in accordance with the invention will now be described, by way of example only, and with reference to the accompanying drawings in which like reference signs are used to denote like parts and in which the FIGURES relate to the digital system of FIG. 1, unless otherwise stated, and in which:

FIGS. 12A and 12B present a flowgraph of another method used by the software development system of FIG. 2 to transfer a write request to a shared memory location from a processor having read-only access to that location to a processor which has write access;

FIGS. 13A–13D present flowgraphs of methods for maintaining the coherency of software breakpoints in common shared memory used by the software development system of FIG. 2;

FIG. 14 presents a flowgraph of a method for transparently maintaining cache coherency used by the software development system of FIG. 2 when debugging a multiple processor system with common shared instruction memory;

Corresponding numerals and symbols in the different figures and tables refer to corresponding parts unless otherwise indicated.

DETAILED DESCRIPTION OF EMBODIMENTS OF THE INVENTION

Thus, a need has been identified for a software development system and methods to handle the debugging of software applications on hardware architectures comprised of multiple processors with shared memory. The software development system should be constructed in such a way as to comprehend most conceivable combinations of processors, memory, cache, and memory access limitations without requiring specialized debugging support. It should require no additional hardware support and very minimal software support from the debugger. The architecture of the software development system must be able to comprehend the memory access limitation of the entire system, i.e., which processors can read/write which parts of memory, manage cache coherency as a result of memory writes, and provide software breakpoint coherency. Methods must be provided to handle write accesses to shared memory from a debug session associated with a processor not having such access, to maintain cache coherency among the processors when changes are made to common shared memory, and to maintain software breakpoint coherency across multiple debug sessions.

Figure 1:
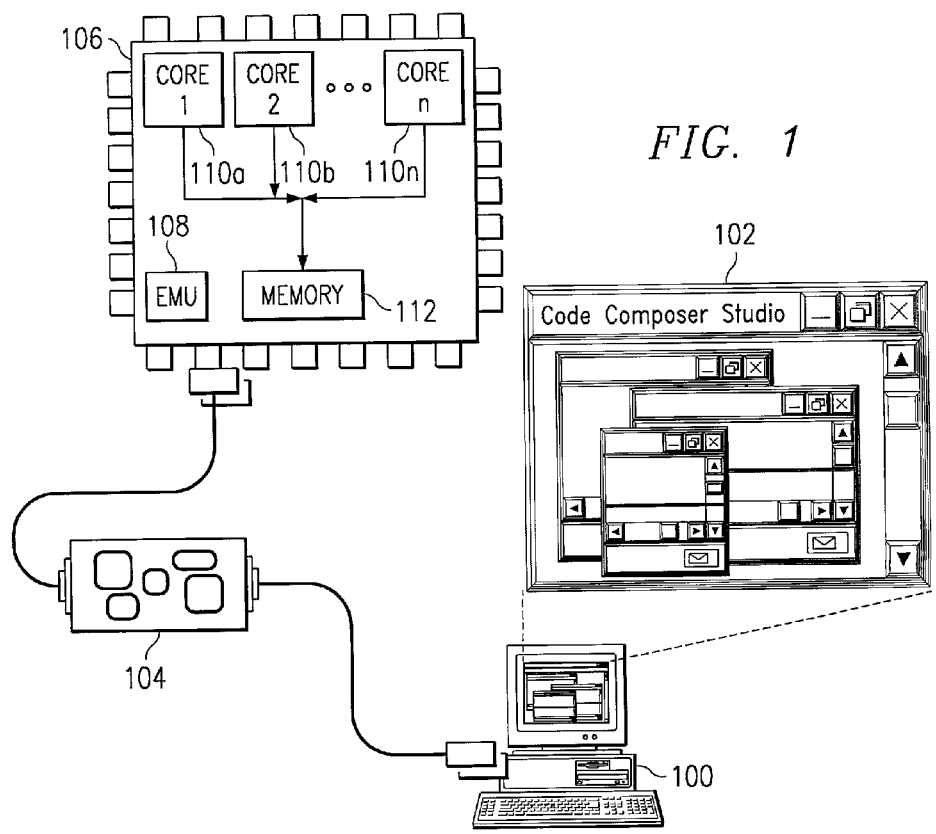
FIG. 1 illustrates the elements of a system for debugging embedded software applications executing on an embedded digital system comprised of multiple processors configured with shared memory.

FIG. 1 illustrates the elements of a system for debugging embedded software applications executing on an embedded digital system comprised of multiple processors configured with shared memory. General-purpose personal computer 100 is connected to target hardware 106 with emulation controller 104. Target hardware 106 is a digital system that includes processors 110a–110n, memory 112, and emulation logic 108 to support software debugging activities.

Processors 110a–110n are connected to memory 112, which holds the application program that is to be debugged. Processors 110a–110n are not necessarily identical but each contains circuitry, e.g., scan chains connected to a test access port, to allow some level of emulation access to registers, local memory, etc. Memory 112 may be any combination of on-chip and off-chip memory. Some portions of memory 112 may be shared by processors 110a–110n. Emulation logic 108 interacts with emulation controller 104 during the debugging of the application program. Typically, emulation controller 104 is connected to target hardware 106 through a JTAG test access port. Details of the general construction of such digital systems are well known and may be found readily elsewhere. For example, U.S. Pat. No. 5,072,418 issued to Frederick Boutaud, et al. describes a digital signal processor (DSP) in detail. U.S. Pat. No. 5,329,471 issued to Gary Swoboda, et al, describes in detail how to test and emulate a DSP. General purpose computing system 100 hosts a software development system that incorporates software debugging and emulation software with which the user interacts through user interface 102.

Figure 2:
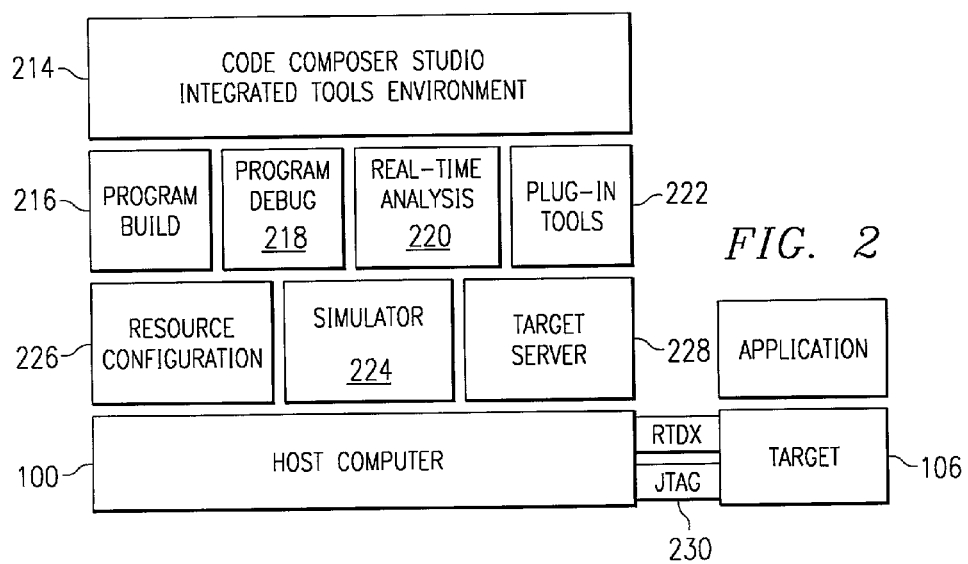
FIG. 2 is a block diagram of the logical architecture of an embodiment of the software development system with user interface 102 that executes on personal computer 100 of the system depicted in FIG. 1.

FIG. 2 is a block diagram of the logical architecture of an embodiment of the software development system with user interface 102 that executes on personal computer 100. The software development system is comprised of a set of tightly integrated modules providing tools to support the entire software development process for embedded software applications. At the top level, Integrated Tools Environment 214 comprises user interface 102, a source code editor, a code profiling tool, and a project management tool. Environment 214 further comprises a general extension language (GEL) similar to C that lets the user create functions to extend the usefulness of the software development system. The GEL language includes a number of predefined functions that allow the user to control the state of the actual/simulated target, access the actual/simulated target memory locations, and to display results in the output window. The GEL language is described completely in the online documentation of the Texas Instruments' software development system Code Composer Studio, version 2.0.

The second level of this architecture comprises the tools for generating code (block 216), for debugging code (block 218), and for analyzing the performance of the code in real-time (block 220). In addition, this level includes support for adding additional development tools as "plug-ins" (block 222). A "plug in" is a software application that may be dynamically added to the software development system to extend the functionality of the system.

The third level provides the low-level support for debugging. It comprises an instruction set simulator (block 224) for host debugging, software for configuring the debug resources available on the target hardware (block 226), and software for interfacing to the target hardware (block 228). An access mechanism 230 connects host computer 100 and target hardware 106. In one embodiment, access mechanism 230 is embodied by emulation controller 104.

Figure 3:
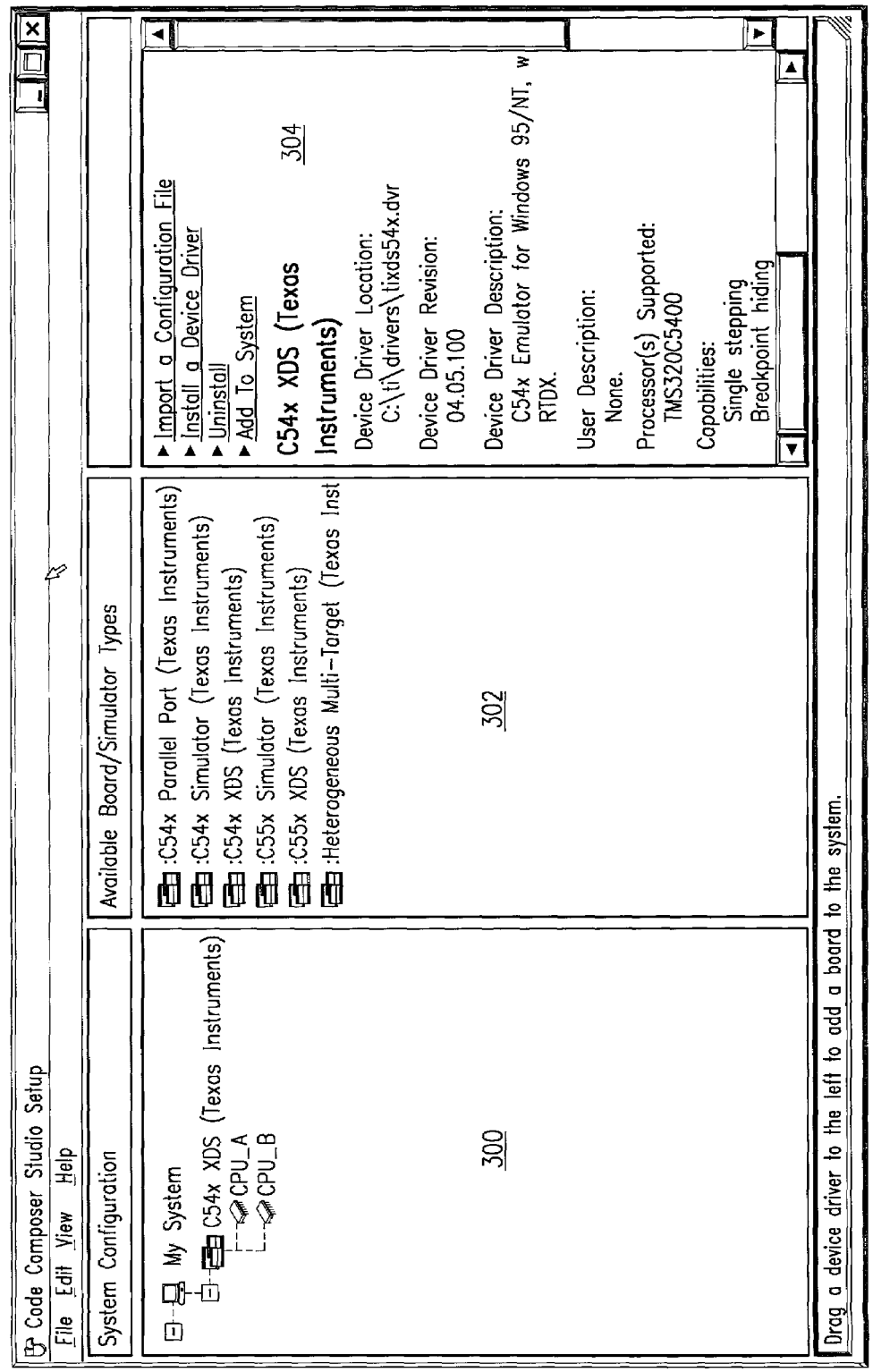
FIG. 3 presents the initial display for a setup utility in the software development system of FIG. 2 that used to define the system configuration of the target hardware.

FIG. 3 presents the initial display of a setup utility for the software development system of FIG. 2 that is used to define the system configuration of the target hardware. This system configuration consists of one or more device drivers that handle communication with the target hardware plus other information and files that describe the characteristics of the target hardware. The specified system configuration is stored in a specially formatted file, the board data file, that is recorded in the system registry where it can be retrieved by the software development system when it is started. When the software development system is started, it uses the information in the specified system configuration to do any required initialization for communication with the target hardware. This initialization includes loading the required drivers and starting debug sessions for each processor in the target hardware.

The setup utility interface is divided into three panes: system configuration pane 300, available board types pane 302, and command/information pane 304. System configuration pane 300 displays a hierarchical representation of the system configuration. The top level is called My System. It holds the system configuration and cannot be modified. The second level displays the target board and the emulation connection used for that board. This level corresponds to a particular device driver. The third level of hierarchy lists the processors on the target board.

Although a multiple processor configuration is represented as a series of boards, in fact each "board" is really either a single processor or a single emulator scan chain that could be attached to one or more boards with multiple processors. The device driver associated with the board comprehends all the processors on the scan chain.

The contents of available board types pane 302 change as selections are made in the system configuration pane 300. When the My System icon is selected in system configuration pane 300, available board types pane 302 lists all available target boards and simulators. Each of these entries represents the device driver for that target. When a target board or simulator is selected in system configuration pane 300, available board types pane 302 lists the processors available for that target. The user may drag-and-drop items from available board types pane 302 to system configuration pane 300. The setup utility does not allow the user to create an unsupported processor or target board configuration.

After adding a target board or simulator to system configuration pane 300, the user may change the properties of that device. The user can specify the board name, the board data file, board properties, the processor configuration (for target boards that allow multiple CPUs) and startup GEL file(s).

Command/information pane 304 provides information describing the target board or simulator highlighted in available board types pane 302. It also contains commands for importing a configuration file, installing or uninstalling a device driver, and adding a device driver to a system configuration.

Figure 4:
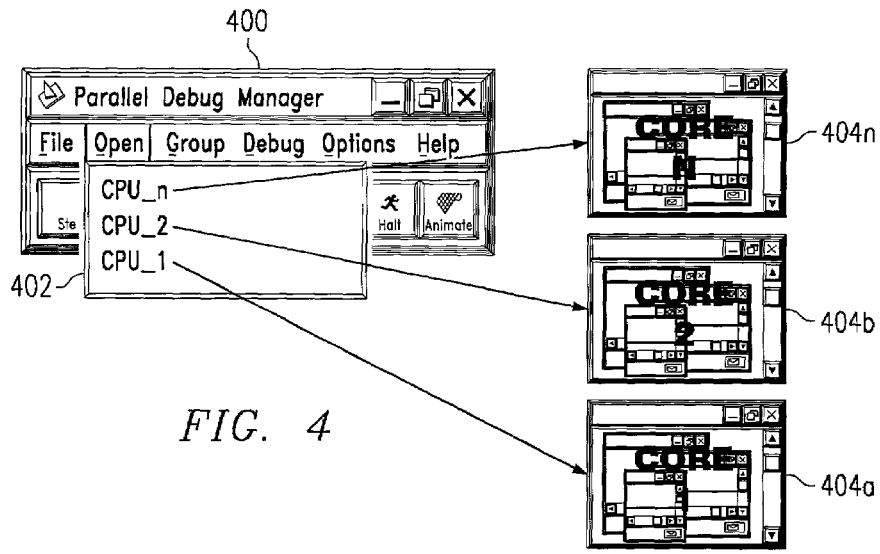
FIG. 4 illustrates the display of a parallel debug manager that is invoked when the software development system of FIG. 2 is initialized with a configuration file describing a target system containing multiple processors.

FIG. 4 illustrates the display of a parallel debug manager (PDM) that is invoked when the software development system of FIG. 2 is initialized with a configuration file describing a target system containing multiple processors. Debug block 218 of FIG. 2 includes the parallel debug manager of FIG. 4. Using Open Dialog 402, the user may open a separate debug window for any processor 110 on target hardware 106. Each debug window will be associated with a debug session for the selected processor that was created when the software development system loaded the system configuration file for the target hardware. The parallel debug manager can be used to broadcast breakpoint commands to processors 110 in the JTAG scan path, as will be described later.

Figure 5:
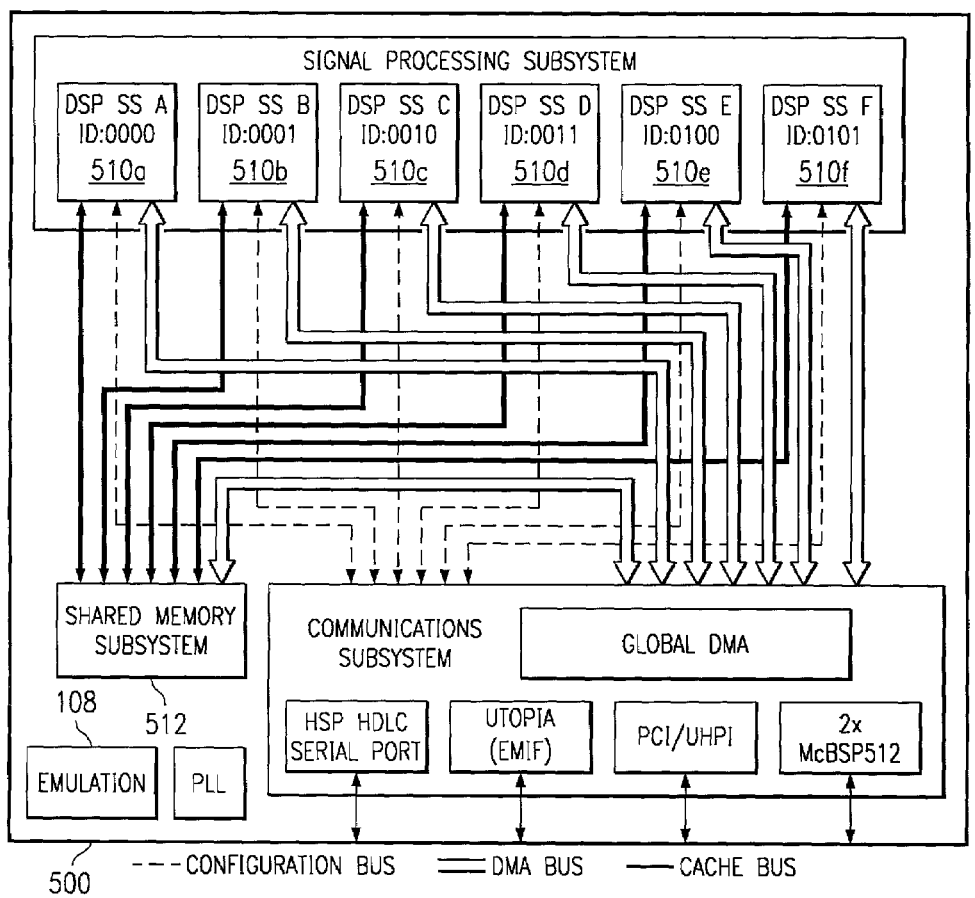
FIG. 5 presents a block diagram of a prototypical embedded digital system comprised of multiple processors configured with shared memory that can be debugged using the software development system of FIG. 1.

FIG. 5 presents a block diagram of a prototypical embedded digital system comprised of multiple processors configured with shared memory that can be debugged using the software development system of FIG. 1. Digital system 500, which corresponds to target hardware 106 of FIG. 1, contains processors 510*a*–510*f*. Processors 510*a*–510*f* have access to shared memory subsystem 512 which is utilized as instruction memory. Shared memory subsystem 512 contains the application program or programs to be debugged. Emulation logic 108 interacts with emulation controller 104 during the debugging of the application program or programs loaded in shared memory subsystem 512. Emulation logic 108 comprises support for:

Non-intrusive access to internal and external memory

Minimally-intrusive access to CPU and peripheral registers

Control of the execution of background code while continuing to service real-time interrupts Break on a software breakpoint instruction (instruction replacement)

Break on a specified program or data access without requiring instruction replacement (accomplished using bus comparators).

Break on external attention-request from debug host or additional hardware

Break after the execution of a single instruction (single-stepping)

Control over the execution of code from device power-up

Non-intrusive determination of device status

Detection of a system reset, emulation/test-logic reset, or power-down occurrence Detecting the absence of a system clock or memory-ready signal Checking if global interrupts are enabled Other embodiments may have a subset of these capabilities. The design of emulation logic for a digital system comprised of multiple processors is well known and is described in detail in U.S. Pat. Nos. 5,329,471 and 5,828,824 issued to Gary Swoboda, et al.

The sharing of instruction memory by multiple processors as illustrated in FIG. 5 creates added complexity for the software development system used to debug applications on such hardware configurations. As described previously, a debug session for each processor is started when the software development system loads the system configuration file. Each debug window started with the PDM of FIG. 4, while only having awareness of the associated processor, may possibly set or clear software breakpoints in shared memory. Other active debug sessions must be made aware of such changes or inconsistent execution results may occur. The software development system must have a method for maintaining the coherency of software breakpoints among the debug sessions.

Figure 6:
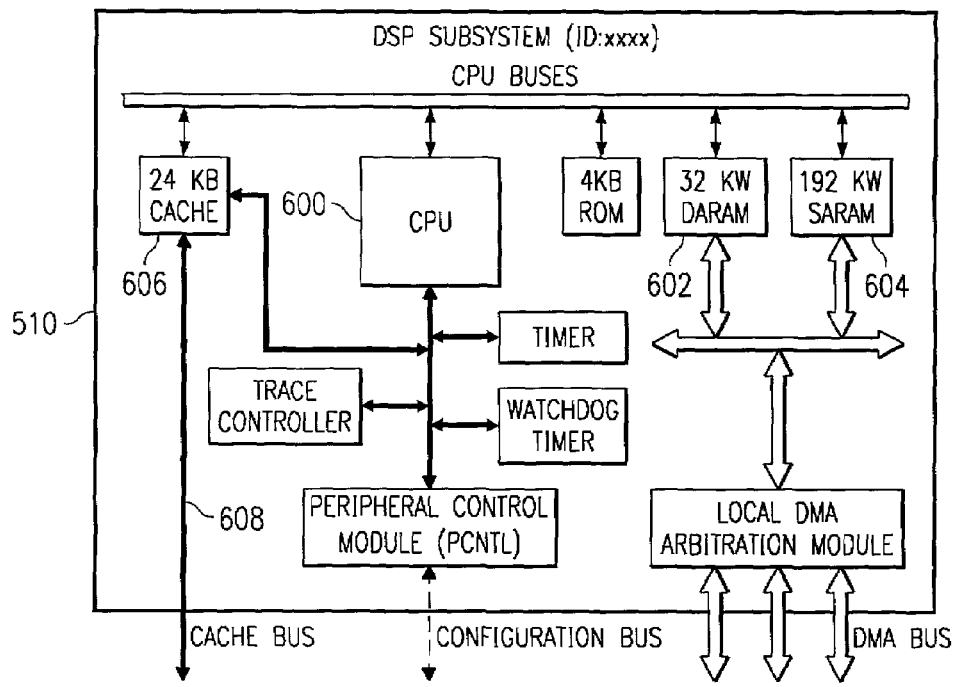
FIG. 6 presents a block diagram of a processor 510 of the digital system of FIG. 5.

FIG. 6 presents a block diagram of a processor 510 of the digital system of FIG. 5. Processor 510 is comprised of central processing unit (CPU) 600, local dual access memories 602, single access memory 604, and instruction cache 606. Local memory 602 is accessible as data memory only and local memory 604 is accessible both as program and data memory. Instruction cache 606 is connected to shared memory subsystem 512 by cache bus 608. Emulation logic 108 has the same access to local memories 602 and 604 and to shared memory subsystem 512 as CPU 600. If CPU 600 does not have write access to shared memory subsystem 512, emulation logic 108 will not have write access to shared memory subsystem 512.

Figure 7:
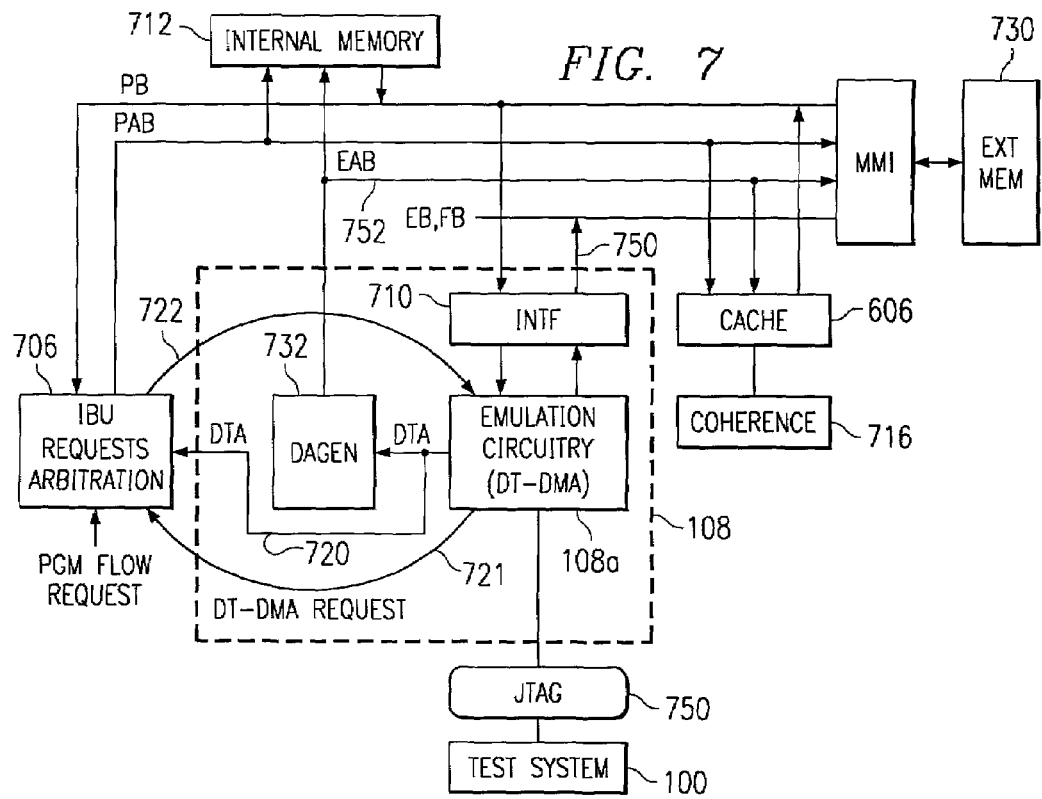
FIG. 7 is a block diagram illustrating emulation logic 108 of FIG. 1 in more detail.

FIG. 7 is a block diagram illustrating emulation logic 108 of FIG. 1 in more detail. Emulation circuitry 108 provides common debug accesses (reading and writing of memory and registers) without direct CPU intervention through a Debug and Test Direct Memory Access CDTDMA.) mechanism 108a. Because the DTDMA mechanism uses the same memory access mechanism as the CPU, any read or write access that the CPU can perform in a single operation can be done via a DT-DMA memory access. The DT-DMA mechanism will present an address via address bus 720 (and data via interface 710, in the case of a write) to the CPU, which will perform the operation during an open bus cycle slot. DT-DMA request signal 721 is asserted by the emulation circuitry to request a read or write transaction. Once memory 712 or 730 has provided the desired data, it is presented back to the DT-DMA mechanism. DT-DMA ready signal 722 is asserted by instruction buffer unit 706 to indicate that a requested data item is available to the emulation circuitry.

The DT-DMA mechanism can operate in either a preemptive or non-preemptive mode. In non-preemptive mode, the DT-DMA mechanism waits for the desired memory bus(es) to be unused for a cycle (referred to as a hole), at which point the DT-DMA mechanism uses it to perform the read or write operation. These memory holes will occur naturally while the CPU is running (e.g. while waiting on newly fetched data or during a pipeline protection cycle). A program memory hole will occur when the fetch queue is full, typically due to several consecutive instructions with no branches. In preemptive mode, a NULL is jammed into the decode stage of the pipeline, essentially creating a hole. Non-preemptive accesses to zero-wait state memory 712 take no cycles away from the CPU. If wait-stated memory 730 is accessed, the pipeline will stall during each wait-state, just as a normal memory access would cause a stall. CPU registers must always be accessed preemptively. Also, it is possible for the debug software to jam certain instructions into the pipeline using the DT-DMA mechanism. This must be done preemptively.

For a data write, Data Address Generation circuitry (DAGEN) 722 schedules a write request in response to a request 721 from the emulation circuitry and a DT-DMA address is placed on the address bus EAB 752. Write data is simultaneously placed on the E and F busses 750 in response to a control signal. A tag signal on address bus EAB 752 is also asserted by DAGEN 722 in response to the DT-DMA request so that the write transaction can be identified as such by instruction cache 606, which monitors the write address bus EAB 752. Coherence circuitry 716 monitors address bus EAB 752 and causes cache 606 to invalidate a cache entry, if the address of a cache entry matches the DT-DMA write address.

Figure 8:
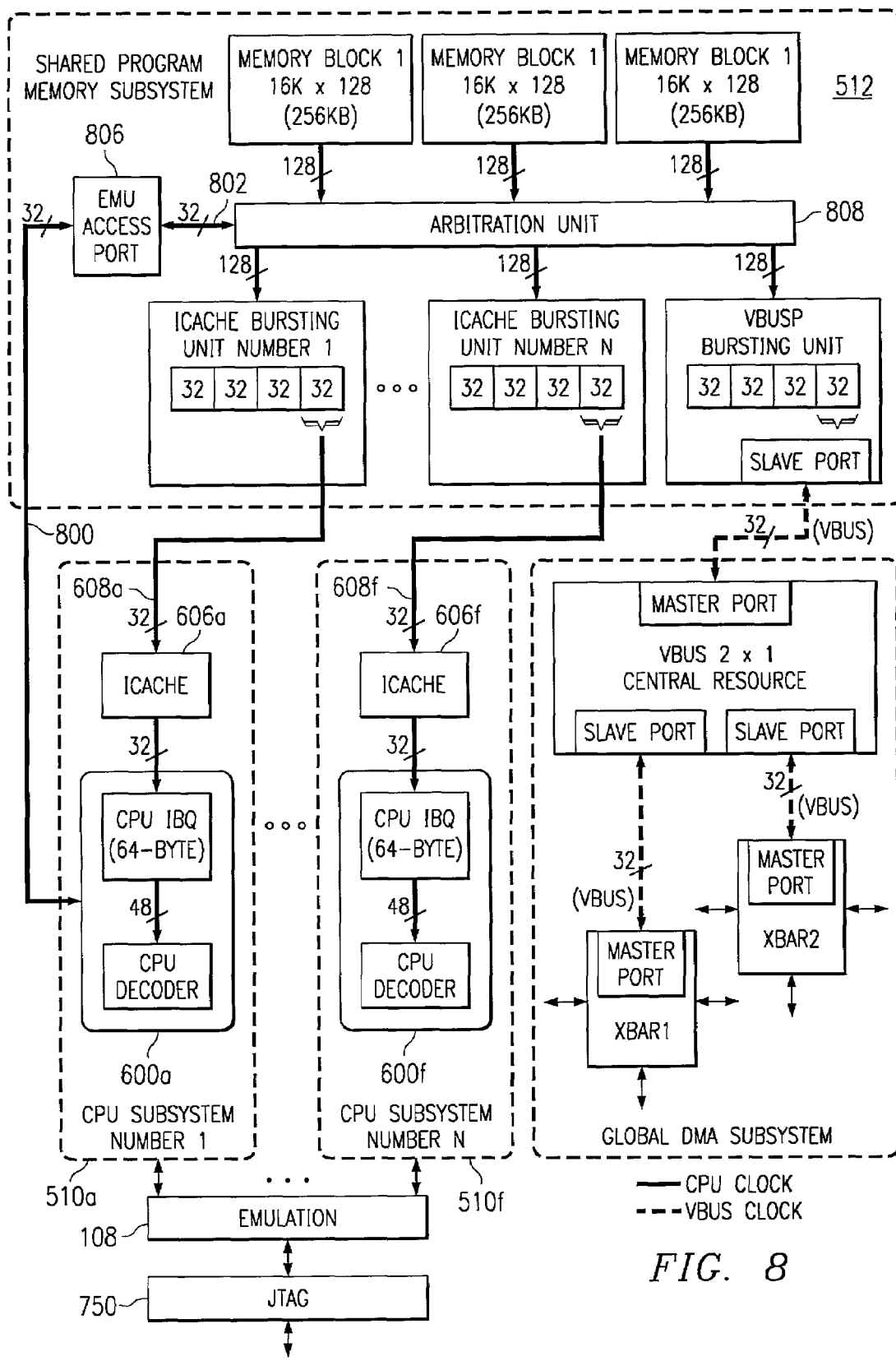
FIG. 8 presents a block diagram of one embodiment of the data flow paths between the shared memory and the processors of FIG. 5.

FIG. 8 presents a block diagram of one embodiment of the data flow paths between the shared memory and the processors of FIG. 5. CPUs 600a–600f have read access to shared memory subsystem 512 through cache buses 608a–608f to fill instruction caches 606a–606f respectively. However, only CPU 600a has write access to shared memory subsystem 512. Emulation access port 806 provides emulation logic 108 access to shared memory subsystem 512. Emulation access port 806 is connected to shared memory arbitration unit 808 via bidirectional bus 802. The other side of emulation access port 806 is connected to CPU 600a by bidirectional bus 800. Emulation logic 108 is able to read and write local memories 602 and 604 on CPUs 600a–600f but only has write access to shared memory subsystem 512 through CPU 600a. Emulation logic 108 uses CPU 600a to perform any needed reads or writes to shared memory subsystem 512, such as managing software breakpoints or loading programs. Note that CPUs 600a–600f are all designed identically but only CPU 600a is connected to emulation access port 806.

The limited write access to shared instruction memory as illustrated by FIG. 8 creates added complexity for the software development system used to debug applications on such hardware configurations. As described previously, a debug session for each processor is initiated by the software development system when the system configuration file is loaded. Each debug session requires write access through the emulation logic to shared instruction memory to carry out typical debug operations such as loading new code segments into shared memory or managing software breakpoints. Such write access is only available through CPU 600a so the software development system must have a method for transferring write requests to shared instruction memory from the debug sessions for CPUs 600b–600f to CPU 600a.

Additional debugging complexity is introduced by the presence of instruction caches 606a–606f in processors 510a–510f. Because a location in common shared memory may be contained in one or more of instruction caches 606a–606f, the caches must be invalidated when an emulation write occurs to shared memory subsystem 512 to insure coherence with the common shared memory. The method used to invalidate cache needs to balance hardware complexity against software efficacy. At one extreme, hardware support for multiprocessor bus snooping to invalidate all caches might be provided, but at high cost. At the other extreme, common shared memory segments can be made non-cacheable, sacrificing execution speed. A good middle ground alternative is to provide a method whereby the software development system can invalidate all caches. The software development system could invalidate the instruction cache of each processor having access to the common shared memory segment by performing the write to common shared memory on each processor. The drawbacks of this approach include wasted bandwidth due to multiple writes of the same data to common shared memory and temporary incoherence of the system as each cache is invalidated in turn.

Another limitation of this method for invalidating cache becomes apparent when the target hardware architecture limits the write access of the processors to shared memory such as in the embodiment of FIG. 8. Maintaining cache coherence generally requires a write path to shared memory from all processors that have read access to the shared memory. Depending on the design of the cache hardware, either the entire cache is invalidated if an memory location is written that is contained in the cache or just the cache entry corresponding to the memory location is invalidated. An alternate approach to maintaining cache coherence must be employed when such a write path is not provided. One possible solution is to increase hardware cost by designing the system in such as way as to allow the emulator to write to memory even though the processor cannot. Another approach is to have the emulation software understand the organization of the cache and have it invalidate cache entries. This solution then ties cache invalidation capabilities to emulation software release. Each time a new cache organization is developed, new emulation software must be provided. A more efficient method for effecting instruction cache invalidation is desirable.

Figures 9, 10:
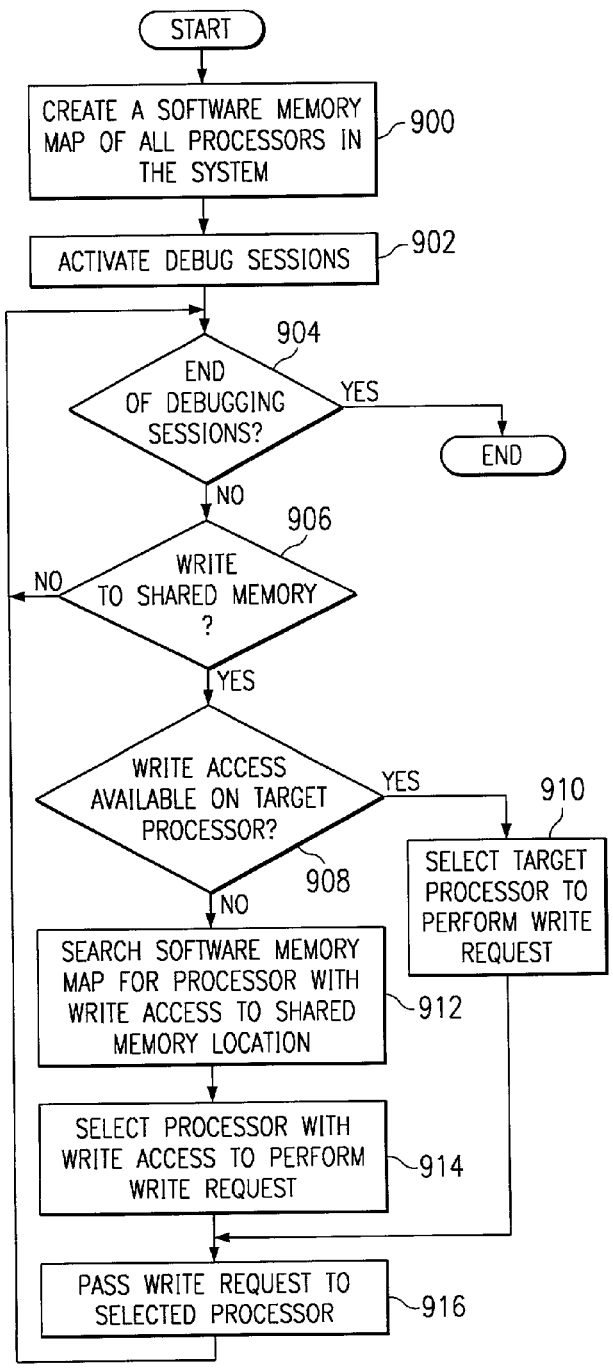
FIG. 9 presents a flowgraph of a method used by the software development system of FIG. 2 to transfer a write request to a shared-memory location from a processor having read-only access to that location to a processor which has write access.
FIG. 10 illustrates a memory map of one or more processors 510 of the digital system of FIG. 5.

FIG. 9 presents a flowgraph of a method used by the software development system of FIG. 2 to transfer a write request to a shared-memory location from a processor having only read access to that location to a processor which has write access. Such a method is advantageous when debugging a target hardware architecture in which two or more of the processors have shared memory and at least one of those processors does not have write access to the shared memory. At step 900, a software memory map detailing how each processor in the target hardware views physical memory is created. This software memory map may be a single data structure or multiple data structures. The software memory map is created when the software development system of FIG. 2 loads the startup GEL file for each processor specified in the system configuration of the target hardware. A predefined GEL function, GEL_MapAddStr( ), is used in the startup file(s) to identify the shared memory segments of the target hardware in the memory map.

GEL_MapAddStr( ) has four parameters: address, page, length, "attribute", and waitstate. The address parameter identifies the starting address of a range in memory. The page parameter identifies the type of memory in the address range: instruction memory, data memory, or I/O space. The length parameter defines the length of the range of memory. The attribute parameter is a string that defines one or more attributes for the specified memory range. The waitstate parameter defines the number of waitstates for that memory range.

Two special attribute strings are used to specify shared memory: RAM|SHnC|CACHE and ROM|SHnC|CACHE. The first element of the attribute string must identify the type of access available to emulation logic 108: RAM or ROM. The rest of the attributes can be specified in any order. RAM specifies that access to memory is read and write. ROM specifies that access to memory is read-only. The SHNC element of the attribute string is broken down as follows: the string "SH" specifies shared memory, the number n identifies the segment of memory being shared, and the string "C" is used to designate common shared memory. i.e. memory that contains code or data that will be accessed or executed by more than one processor, possibly simultaneously. The "C" designation causes the debugger to halt all processors that share the designated memory when a write occurs to that shared memory and to halt all processors when stepping over a breakpoint set in that shared memory. "C" is optional, but should always be appended as the default setting. The default settings for these actions can be overridden by setting shared memory options as described later in the discussion of FIG. 15. The CACHE element of the attribute string causes the target driver to invalidate the cache when any processor writes to the shared memory block.

FIG. 10 illustrates a memory map of one or more processors 510 of the digital system of FIG. 5. As discussed earlier, various processors may have different memory maps. If emulation logic 108 has both read and write access to shared memory 1000 through a processor 510, its associated startup GEL file will identify the shared memory by the GEL function call: GEL_MapAddStr(0xF40000, 0, RAM|SH1C|CACHE, 0). This function call indicates that there is common shared instruction memory beginning at address 0xF40000, emulation logic 108 has both read and write access to this shared memory through the processor, and the processor has an instruction cache. If emulation logic 108 has only read access to shared memory 1000 through a processor 510, its associated startup GEL file will identify the shared memory by the GEL function call: GEL_MapAddStr(0xF40000, 0, ROM|SH1C|CACHE, 0). This function call indicates that there is common shared instruction memory beginning at address 0xF40000, emulation logic 108 has only read access to this shared memory through the processor, and the processor has an instruction cache. If the data flow paths for processors 510a–510f are as illustrated by FIG. 6, the startup GEL file for processor 510a will contain the GEL function call GEL_MapAddStr (0xF40000, 0, RAM|SH1C|CACHE, 0) to indicate that emulation logic 108 has write access to shared memory 1000 through it. The startup GEL files for processors 510b–510f will contain the GEL function call MapAddStr(0xF40000, 0. ROM|SH1C|CACHE. 0) to indicate that emulation logic 108 does not have write access to shared memory through them.

Shared memory segments may be in different addressable regions for different processors. That is, on processor A, the segment might start at 0x8000 and on processor B the same segment could start at 0x4000. Equivalent segment sizes are generally expected though segments of varying size may be specified and the behavior of the methods described herein is predictable. The segment number n in the SHnC element of the attribute string will be the same for both processors but the address will differ. The shared memory segment for processor A might be specified in the startup GEL file by the function call GEL_MapAddStr(0x8000, 0, RAM|SH1C|CACHE, 0) and the same segment for processor B might be specified by GEL_MapAddStr(0x4000, 0, ROM|SH1C|CACHE, 0).

Referring again to FIG. 9, in step 902, debug sessions are activated for two or more processors in the system and at least one debug window is opened for one of the debug sessions. These debug sessions are comprised of the minimal functionality required to permit coordination of debug information among the processors. Using the parallel debug manager depicted in FIG. 4, the user selects open option 400. In response to this selection, open dialog box 402 is displayed. Open dialog box 402 contains a list of all of the processors in the target hardware. Selecting processors from this list causes debug windows 404 to be activated for those processors.

As steps 904 and 906 indicate, all memory accesses from the active debug sessions are monitored to detect if a write request is made to a shared memory segment. If a write request to a shared memory segment is detected in step 906, a check is made at step 908 to determine if the processor associated with the debug session making the write request has write access to shared memory location. If the processor does have write access, it is selected to perform the write as indicated by step 910. If it does not have write access, the memory maps of the other processors in the target system are searched at step 912 to locate a processor that does have write access to the shared memory location. As step 914 shows, the processor found in step 912 is selected to perform the write request. At step 916, the write request is passed to the processor selected at step 910 or step 914.

Figure 11:
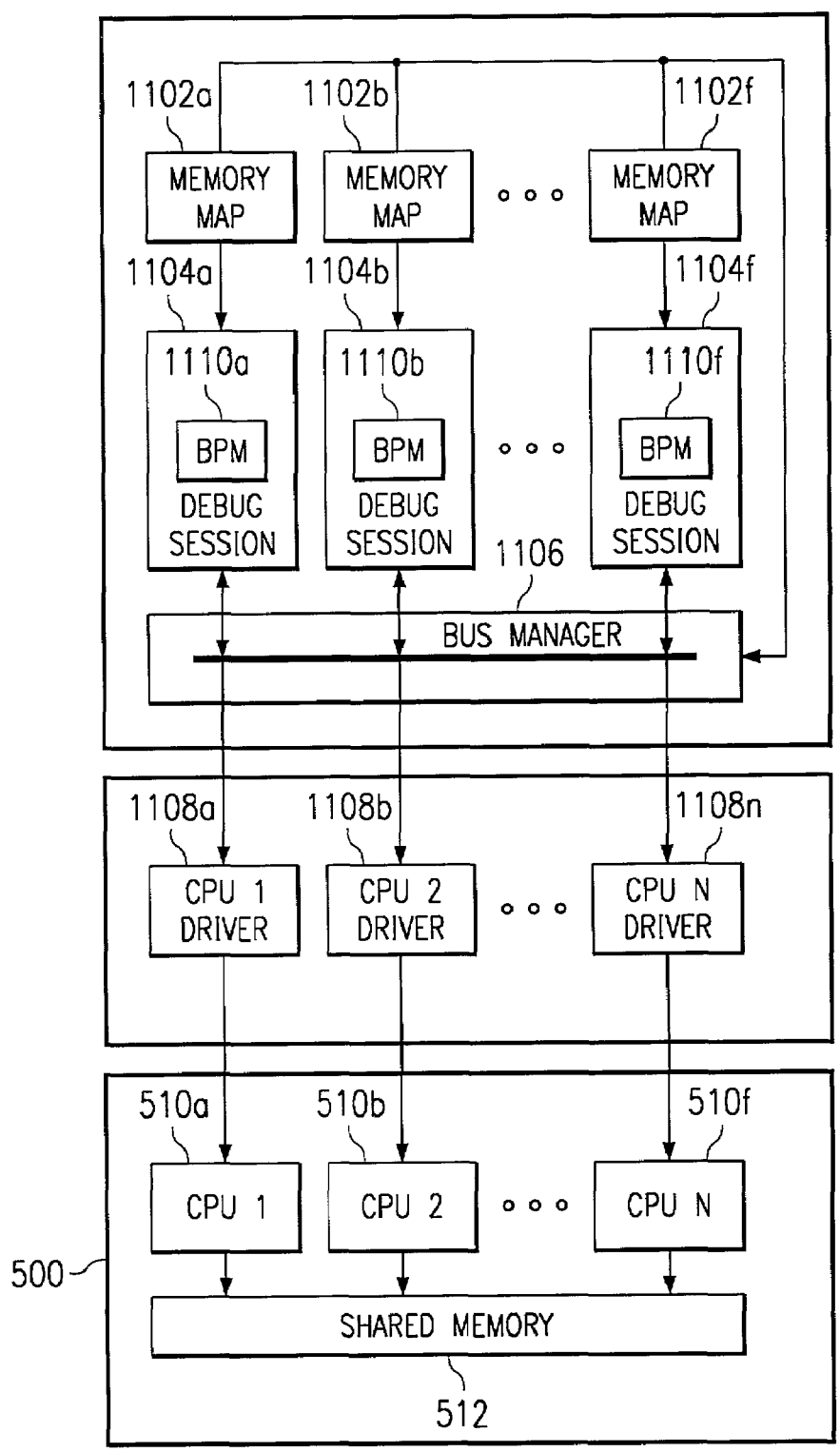
FIG. 11 depicts the logical architecture of the software development system of FIG. 2 when configured for debugging a target hardware system with multiple processors and shared memory such as that depicted in FIG. 5.

FIG. 11 depicts the logical architecture of the software development system of FIG. 2 when configured for debugging a target hardware system with multiple processors and shared memory such as that depicted in FIG. 5. Memory maps 1102a–1102f are a software representation of the memory layout of target hardware 500. These memory maps are created when the software development system is initialized as described in the discussion of step 900 above. Drivers 1108a–1108f are also instantiated for processors 510a–510f. These drivers provide the communication interface between debug sessions 1104a–1104f and processors 510a–510f. Debug sessions 1104a–1104f are also activated for processors 510a–510f respectively. Each debug session 1104 comprises a breakpoint manager 1110 that manages all software breakpoints for the session.

Bus manager 1106 is a software layer between debug sessions 1104a–1104f and drivers 1108a–1008f that is responsible for the activities depicted in step 908 through step 916 of the method of FIG. 9. When bus manager 1006 receives a write request to shared memory 512 from a debug session 1104, the bus manager checks the memory map 1102 for the debug session 1104 making the write request to see if the processor 510 for which the debug session 1104 was activated has write access to the memory location in shared memory 512. If the processor 510 does have write access to the memory location, bus manager 1106 sends the write request to the driver 108 for the processor 510 associated with the debug session 1104 that initiated the write request. If the processor 510 does not have write access, bus manager 1106 searches the memory maps 1102a–1102f to find a second processor 510 that does have write access to the shared memory location. Bus manager 1106 then sends the write request to driver 1108 for the selected second processor 510.

FIGS. 12A and 12B present a flowgraph of another method used by the software development system of FIG. 2 to transfer a write request to a shared memory location from a processor having read-only access to that location to a processor which has write access. This method is the method of FIG. 9 with additional improvements. If the processors in the target hardware have instruction caches and share instruction memory, the instruction caches must be invalidated when a value is written to the shared memory. Step 900 as described above is enhanced to include denoting in the software memory map those areas of memory that contain instructions and those that contain data. Steps 902–916 are as described previously. Subsequent to step 916, execution moves to step 1200 of FIG. 12B. At step 1202, a check is made to determine if the write request was to instruction memory. If the write request is not to instruction memory, the method resumes at step 904. Otherwise, at step 1204, the memory map is searched to locate all other processors that share the memory location. At step 1206, the write request is broadcast to all processors located in step 1204. Each processor will perform instruction cache coherency updates if required as indicated by step 1208. The method then resumes at step 904.

Returning to FIG. 11, the steps of the method of FIGS. 12A–12B that are analogous to those of the method of FIG. 9 are executed by the software development system as described in the previous discussion of FIG. 11. Memory maps 1102a–1102f are created as discussed with step 900, using the page parameter of the GEL_MapAddStr( ) function to denote whether the shared memory segment is instruction memory or data memory. The determination as to whether the write request is to instruction memory or data memory (step 1202) is made by bus manager 1106 by looking at the memory map 1102 associated with the debug session 1104 that made the write request. If the write request is to instruction memory, bus manager 1106 searches all memory maps 1102 to locate processors 510 that share the memory location. It broadcasts the write request to the drivers 1108 of the located processors 510. The drivers 1108 cause instruction cache coherency updates to occur where required on their associated processors 510.

In another embodiment, steps 1206 and 1208 are accomplished in a more efficient way through a special write request. The special write request, which is broadcast to all processors located in step 1204, indicates that the data has already been written to the shared memory location by another processor. Therefore, the processors receiving this special write request do not necessarily have to perform the write. But, if necessary, the processors receiving the special write request will perform instruction cache coherency updates. The processors may accomplish the cache coherency updates without requiring an actual write to memory through the use of special emulation circuitry as described above in the discussion of FIG. 7.

In other embodiments, the method of FIG. 12 may be altered to handle the invalidation of different types of caches including instruction caches, data caches, and translation lookaside buffers (TLB) used for mapping virtual memory addresses to physical addresses. Step 1202, the check for a write to instruction memory, may be removed if two or more of the different types of caches are present, or may be altered to check for a write to data cache or write that affects the TLB has occurred if only data cache or only TLB support is present. At step 1208, any type of cache that is affected by the write is invalidated. And, steps 1206 and 1208 may be further enhanced by providing a special write request as previously described.

Figure 13A:
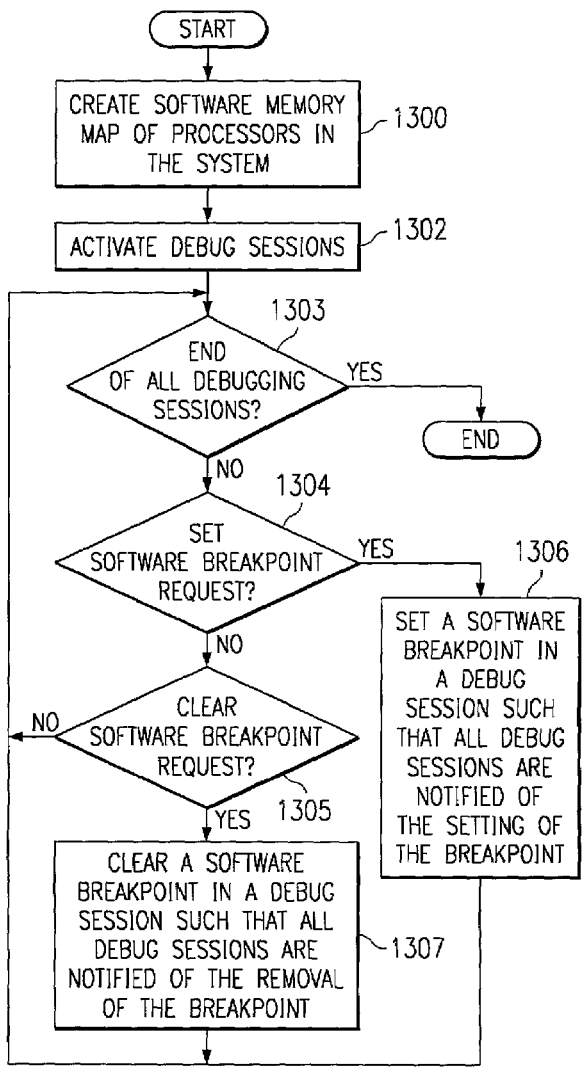

FIGS. 13A–13D present flowgraphs of methods for maintaining the coherency of software breakpoints in common shared memory used by the software development system of FIG. 2. To maintain coherency of software breakpoints across multiple debug sessions, any software breakpoint set or cleared in common shared memory must be set or cleared for every processor having read access to the common shared memory. FIG. 13A presents a flowgraph for a method to maintain software breakpoint coherency across multiple debug sessions. At step 1300, a software memory map detailing how the processors in the target system may access and use memory is created. At step 1302, two or more debug sessions are activated and at least one debug window is opened. As indicated by step 1303, the method terminates when the debug sessions are terminated. At step 1304, a check is made to determine if one of the debug sessions has requested that a software breakpoint be set in common shared memory. If such a request has been made, at step 1306 the software breakpoint is set such that all debug sessions are notified of the setting of the breakpoint and the method continues at step 1303. If the setting of a breakpoint has not been requested, the method continues at step 1305 where a check is made to see if one of the active debug sessions has requested that a software breakpoint in common shared memory be cleared. If not, the method continues at step 1303. If a clear request has been made, at step 1307, the software breakpoint is cleared such that all active debug sessions are notified that the breakpoint has been cleared. The method then continues at step 1303.

The software memory map is created and the debug sessions are activated as described with FIG. 9 above. Bus manager 1106 of FIG. 11 intercepts the software breakpoint setting and clearing requests from each active debug session 1104 and causes all debug sessions 1104 to be notified of any breakpoint changes in common shared memory. When a breakpoint is set or cleared in common shared memory by a debug session 1104, bus manager 1106 searches memory maps 1102 to locate all processors 510 having read access to the common shared memory and their associated debug sessions. Bus manager 1106 interacts with the breakpoint manager 1110 of each located debug session 1104 to update the breakpoint table for the debug session appropriately.

Figure 13B:
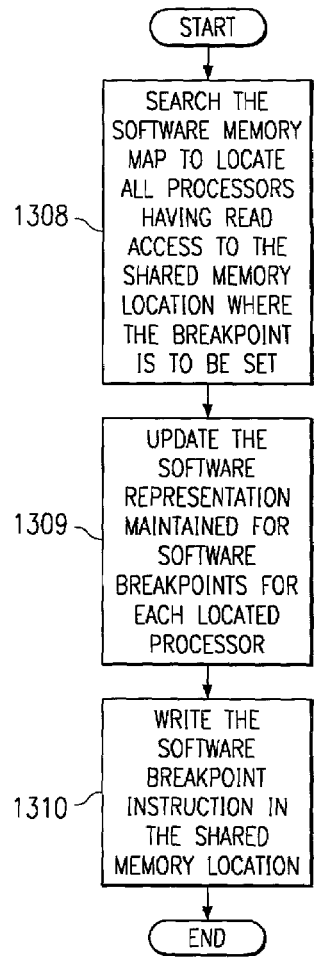

FIG. 13B presents a flowgraph of an improvement to the method of FIG. 13A. Steps 1308–1310 replace step 1306 of FIG. 13A. At step 1308, the software memory map is searched to locate all processors having read access to the common shared memory location where the software breakpoint is to be set. At step 1309, the software representation maintained for software breakpoints for each located processor is updated to reflect the setting of the breakpoint. At step 1310, the software breakpoint instruction is written to the common shared memory location.

FIG. 13C presents a flowgraph of an improvement to the method of FIG. 13A. Steps 1311–1313 replace step 1307 of FIG. 13A. At step 1311, the original instruction store in the software representation maintained for software breakpoints is written into the common shared memory location that contains the software breakpoint instruction. At step 1312, the software memory map is searched to locate all processors having read access to the common shared memory location where the software breakpoint was set. At step 1313, the software representation maintained for software breakpoints for each located processor is updated to reflect the removal of the breakpoint.

Figure 13D:
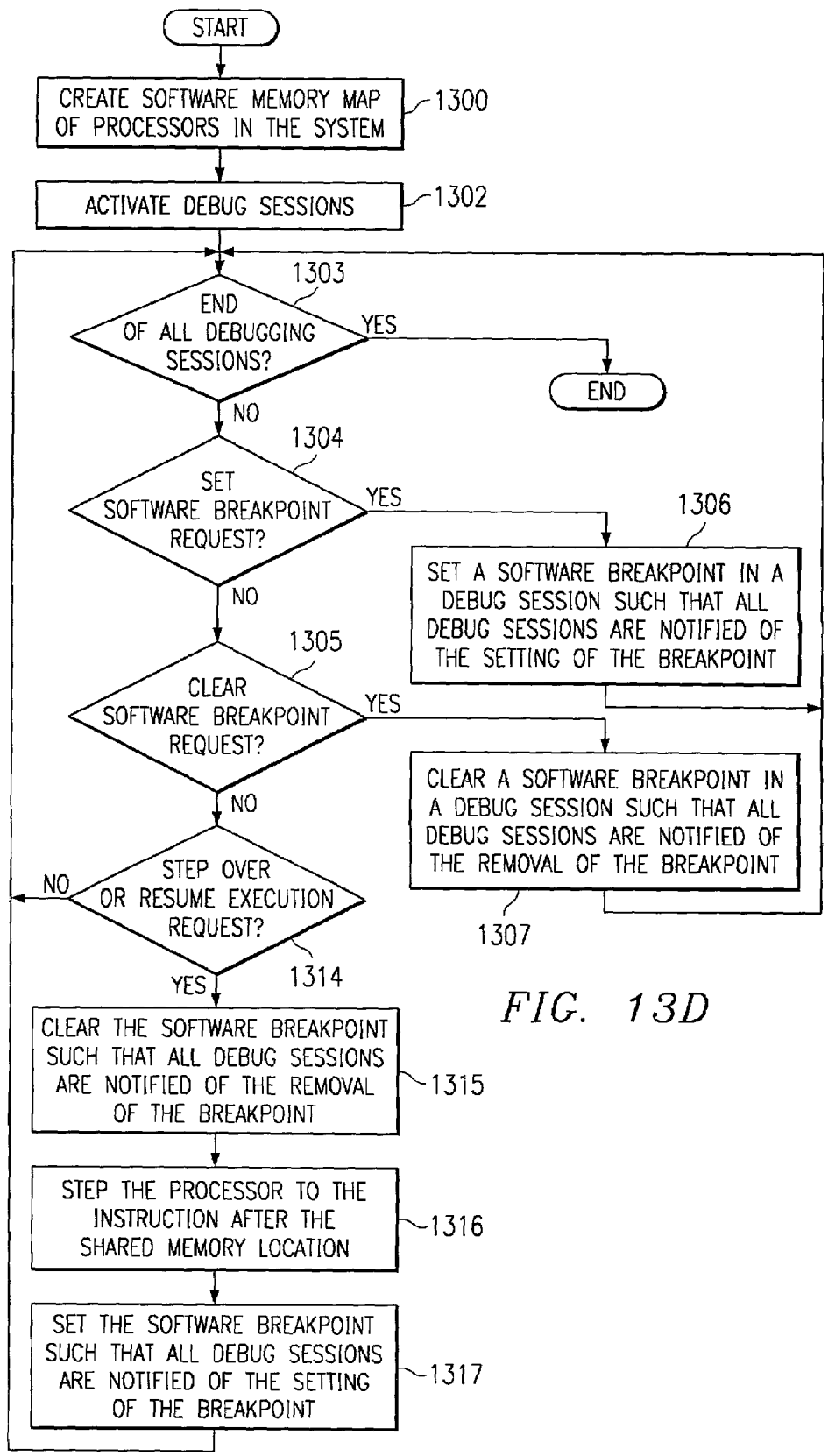

FIG. 13D presents a flowgraph of an improvement to the method of FIG. 13A. Steps 1314 to 1317 have been added to incorporate a method for stepping over a software breakpoint in common shared memory or resuming execution after hitting a breakpoint in common shared memory. At step 1305, if there is no request to clear a breakpoint, the method continues at step 1314. At step 1314, a check is made to determine if there is a request to step over a software breakpoint in common shared memory or resume execution after hitting a breakpoint in common shared memory. If there is not, the method resumes at step 1303. If there is such a request, at step 1315 the software breakpoint is cleared in such a way that all debug sessions are notified that the breakpoint has been removed. At step 1316, the processor for which the request was made is stepped to the instruction after the shared memory location containing the software breakpoint. At step 1317, the software breakpoint is again set such that all debug sessions are notified of the setting of the breakpoint.

The methods of FIGS. 13A–13D may be further improved to maintain coherency of software breakpoints on target systems such as that presented in FIG. 8 where all processors do not have write access to the common shared memory by incorporating the methods of FIG. 9 and FIG. 12. And, for target systems where the processors have cache, the cache coherency method of FIG. 14 may be incorporated into the methods of FIGS. 13A–13D.

FIG. 14 presents a flowgraph of a method for transparently maintaining cache coherency used by the software development system of FIG. 2 when debugging a multiple processor system with common shared instruction memory. At step 1400, a software memory map is created. In this software memory map are indications as to whether or not the shared memory locations contain program instructions and whether or not a processor has an instruction cache. At step 1402, one or more debug sessions are activated. As indicated by step 1404, the method is used until all debug sessions are terminated. At step 1406, a check is made to see if a debug session has requested a write to shared memory. If not, the method continues at step 1404. If a write to shared memory has been requested, the write request is passed to the processor associated with the debug session making the request for execution at step 1407. At step 1408, a check is made to determine if the memory location written is in shared instruction memory. If it is not, the method continues at step 1404. If the memory location written is in shared instruction memory, at step 1410 the software memory map is searched to locate all processors having read access to the shared memory location. At step 1412, the write request is broadcast to all process having the read access. At step 1414, instruction cache coherency updates are performed if necessary as a result of the write to instruction memory. The method then continues at step 1404.

An enhanced version of the method of FIG. 14 is provided by replacing step 1407 with steps 908 to 916 of the method of FIG. 9 such that the cache coherency method will work on target hardware architectures in which all processors do not have write access to common shared instruction memory such as the architecture depicted in FIG. 8. An additional enhancement is provided by incorporating in step 1414 the use of a special write request as described previously with steps 1206 and 1208 of FIG. 12.

In an embodiment, the cache coherency methods are implemented by the logical architecture of FIG. 11 in which bus manager 1106 handles shared memory access issues so that debug sessions 1104 are not required to have knowledge of the actual memory usage of their associated processors. Bus manager 1106 monitors all write requests from the debug sessions 1104 to detect any requests to write to shared instruction memory. If such a write request is made by a debug session 1104, bus manager 1106 sends the write request to the driver 1108 for the processor 510 associated with the requesting debug session 1104. Bus manager 1106 then searches memory maps 1102 to locate all processors 510 having read access to the location in shared instruction memory that has been changed and notifies the driver 1108 of each located processor 510 that the write has occurred. Each notified driver 1108 then takes appropriate action to cause the instruction cache, if any, of the associated processor 510 to be updated if necessary.

In other embodiments, the method of FIG. 14 may be altered to handle the invalidation of different types of caches including instruction caches, data caches, and translation lookaside buffers (TLB) used for mapping virtual memory addresses to physical addresses. At step 1400, indications of the presence of any type of cache on the processors are included in the software memory map. Step 1408, the check for a write to instruction memory, may be removed if two or more of the different types of caches are present, or may be altered to check for a write to data cache or a write that affects the TLB has occurred if only data cache or only TLB support is present. At step 1414, any type of cache that is affected by the write is invalidated. Enhanced versions, as described with the discussion of FIG. 14 above, should be obvious to one skilled in the art.

Figure 15:
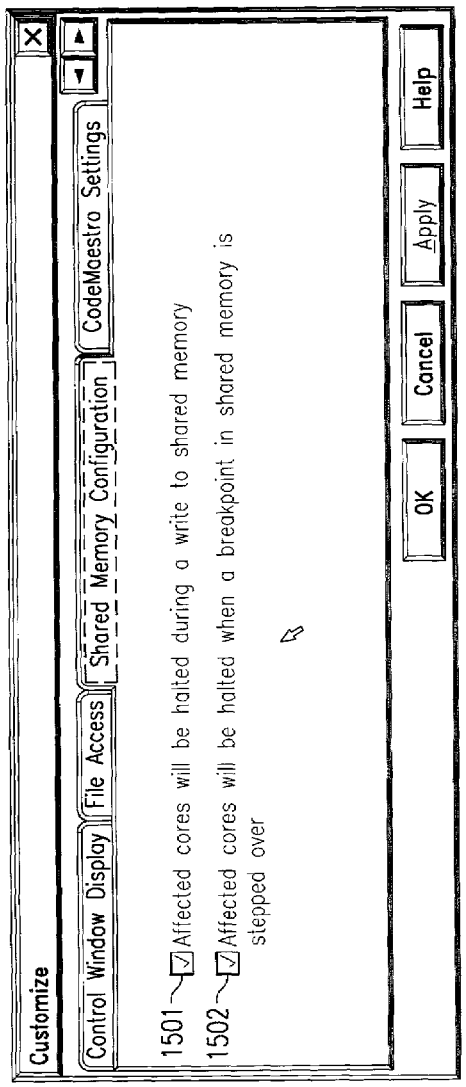
FIG. 15 presents a representation of a dialog window of the software development system of FIG. 2 that permits various options regarding shared memory to be changed by the user while debugging an application.

FIG. 15 presents a representation of a dialog window of the software development system of FIG. 2 that permits various options regarding shared memory to be changed by the user while debugging an application. As a general rule, to insure execution coherency among multiple processors having common shared memory, all processors having read access to a shared memory location that is to be written should be halted during a write to that location. If the shared memory location contains a software breakpoint, that breakpoint will be cleared and reset during the write which could permit invalid code to be executed or cause a breakpoint to be missed if all affected processors are not halted. In addition, the data in that location may be incorrect if the processor was executing.

When stepping over a software breakpoint that is set in common shared memory or resuming execution after hitting the breakpoint, the breakpoint is first cleared, then the code is stepped, and finally the breakpoint is reset. If other processors execute code in that memory location during this time, they could miss the breakpoint.

However, halting the processors does have an adverse impact on any real-time execution behavior of the application. If the user wishes to maximize execution in favor of real-time behavior and risk losing execution coherency, he may use the dialog of FIG. 15 or execute special GEL functions to toggle whether or not affected processors should be halted during a write to shared memory or when a software breakpoint in shared memory is stepped over. Alternatively, if the user knows a shared memory segment is not accessed in certain processors, he can choose not to specify the shared segment in the configuration file for those processors or use GEL commands to remove the segment from the software memory map for those processors.

Option 1501 allows the user to override the default action when writing to a common shared memory location. The user clicks on the check box to toggle this option. Alternatively, the user can execute the GEL functions GEL_SharedMemHaltOnWriteOff( ) and GEL_SharedMemHaltOnWriteOn( ).

Option 1502 allows the user to override the default action when stepping over a software breakpoint (or resuming execution after hitting a breakpoint) that is set in a common shared memory location. The user clicks on the check box to toggle this option. Alternatively, the user can execute the GEL functions GEL_SharedMemHaltOnStepOff( ) and GEL_SharedMemHaltOnStepOn( ).

Figure 16C:
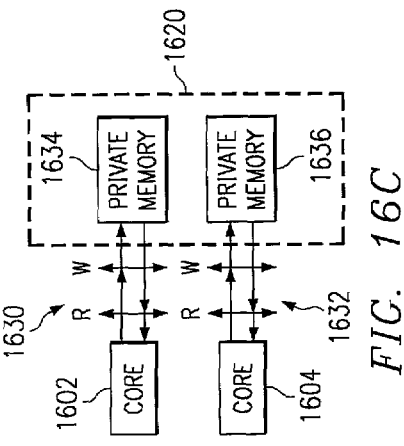
FIGS. 16A–16C illustrate three common configurations of shared memory in target hardware 106 of FIG. 1.
Figure 16B:
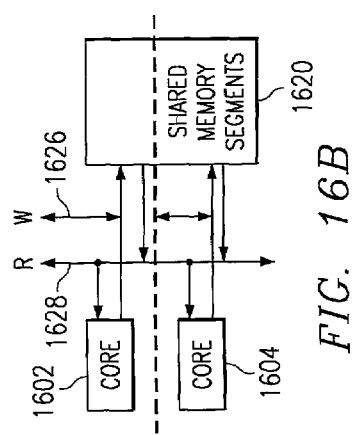
Figure 16A:
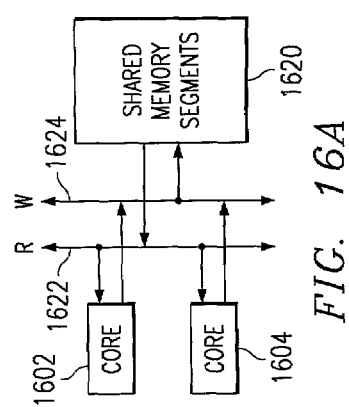

FIGS. 16A–16C illustrate three common configurations of shared memory in target hardware 106 of FIG. 1. In FIG. 16A, processor 1602 and processor 1604 have read and write access through read circuitry 1622 and write circuitry 1624 to all locations in shared memory 1620. In FIG. 16B, processor 1602 and processor 1604 have read access to all locations in shared memory 1620 through read circuitry 1622. However, each processor has write access through write circuitry 1626 only to segments of shared memory 1620 that it owns and segment ownership is not shared. Processor 1602 will not be able to write to shared memory locations owned by processor 1604 and vice versa.

In FIG. 16C, shared memory 1620 is only nominally shared between processor 1602 and processor 1604. Each processor has exclusive read and write access to a portion of shared memory 1620. Processor 1602 has read and write access to private memory 1634 through access circuitry 1630 and processor 1604 has read and write access to private memory 1636 through access circuitry 1632.

In addition to the simple configurations shown in FIGS. 16A–16C, target hardware 106 may have more complex shared memory configurations that are combinations of these. For example, a four processor digital system could be created in which two of the processors share a memory area with each processor having write access to half of the total shared memory. The other two processors in turn share their own area of memory similarly. The methods and systems described herein comprehend the simple shared memory configurations and the more complex configurations.

Figure 17:
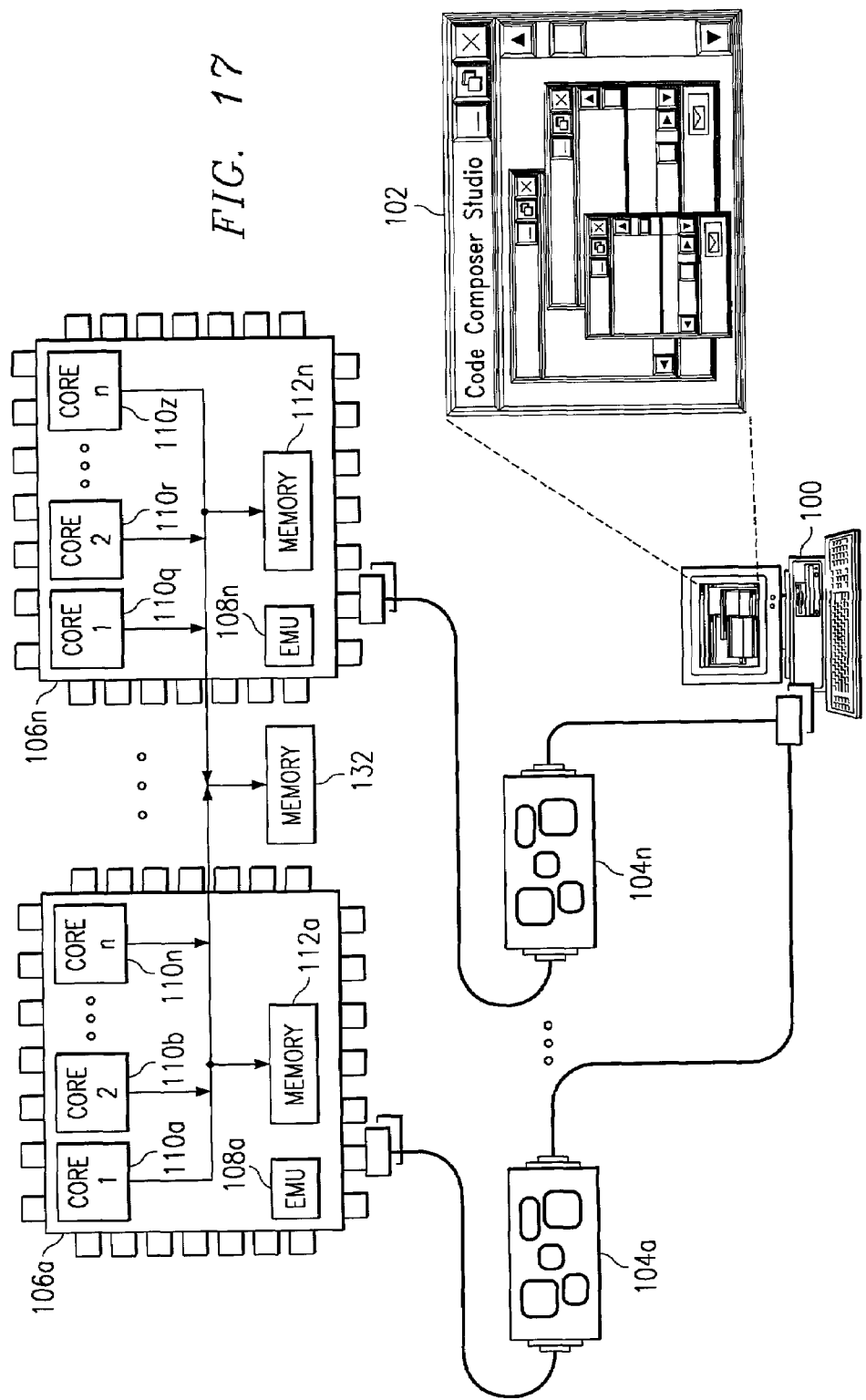
FIG. 17 illustrates the system of FIG. 1 as expanded to allow debugging of software applications running on a hardware architecture comprising multiple digital systems with shared memory.

FIG. 17 illustrates the system of FIG. 1 as expanded to allow debugging of software applications running on a hardware architecture comprising multiple digital systems with shared memory. General-purpose personal computer 100 is connected to target hardware 106a–106n with emulation controllers 104a–104n. Target hardware 106a–106n are digital systems that include processors 110a–110z, memory 112a–112n, and emulation logic 108a–108n to support software debugging activities. Memory 112 may be any combination of on-chip and off-chip memory. Processors 110a–110z are connected to off-chip memory 132.

The fact that a software application to be debugged is being executed on a single target system as illustrated in FIG. 1 or on a multiple board target system as illustrated in FIG. 17 is irrelevant to the operation of the present invention. For purposes of simplicity in this specification, execution on a single target system is assumed. Extension of the invention to multiple board target systems should be obvious to one skilled in the art.

As used herein, "associated" means a controlling relationship, such as a memory resource that is controlled by an associated port.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for maintaining coherency of software breakpoints in shared memory when debugging a multiple processor system, the method comprising the steps of:

creating a software memory map of the memory usage of a plurality of processors in the system to be debugged;

activating a first debug session associated with a first processor of a plurality of processors and at least a second debug session associated with a second processor of the plurality of processors;

setting a first software breakpoint in a shared memory location in the first debug session such that all debug sessions are notified of the setting of the breakpoint, the step of setting comprising searching the software memory map to find a first plurality of processors having read access to the shared memory location;

updating a software representation maintained for software breakpoints for each of the first plurality of processors; and writing the software breakpoint instruction in the shared memory location; and clearing the first software breakpoint in the shared memory location in the second debug session such that all debug sessions are notified of the clearing of the breakpoint.

2. The method of claim 1 wherein the step of writing comprises a method for selecting a processor to execute the write, the method comprising the steps of:
if the first processor associated with the first debug session requesting the setting of the software breakpoint has write access to the shared memory location then
selecting the first processor to perform the write request;
else performing the following steps a–b:
a. searching the software memory map for a second processor with write access to the shared memory location;
b. selecting the second processor to perform the write request; and
passing the software breakpoint instruction to the selected processor to be written into the shared memory location.

3. The method of claim 2 wherein the step of passing the software breakpoint instruction comprises the steps of:
searching the software memory map for a second plurality of processors that have read access to the shared memory location;
broadcasting the write request to the second plurality of processors; and
performing cache coherency updates in response to the write request in each of the second plurality of processors as required.

4. The method of claim 3 wherein the step of broadcasting the write request comprises indicating that the write request is intended for maintaining cache coherency as opposed to a normal write request.

5. The method of claim 4 wherein the step of performing comprises using cache coherency capabilities, if any, of a processor in response to the write request intended for maintaining cache coherency.

6. A method for maintaining coherency of software breakpoints in shared when debugging a multiple processor system, the method comprising the steps of:
creating a software memory map of the memory usage of a plurality of processors in the system to be debugged;
activating a first debug session associated with a first processor of a plurality of processors and at least a second debug session associated with a second processor of the plurality of processors;
setting a first software breakpoint in a shared memory location in the first debug session such that all debug sessions are notified of the setting of the breakpoint; and
clearing the first software breakpoint in the shared memory location in the second debug session such that all debug sessions are notified of the clearing of the breakpoint, the step of clearing comprising
writing the original instruction stored in a software representation maintained for software breakpoints into the shared memory location;
searching the software memory map to find a fourth plurality of processors having read access to the shared memory location; and
updating a software representation maintained for software breakpoints for each of the fourth plurality of processors to remove the software breakpoint for the shared memory location.

7. The method of claim 6 wherein the step of writing comprises a method for selecting a processor to execute the write, the method comprising the steps of:
if the second processor associated with the second debug session requesting the clearing of the software breakpoint has write access to the shared memory location then
selecting the second processor to perform the write request;
else performing the following steps a–b:
a. searching the software representation of the memory map for a third processor with write access to the shared memory location;
b. selecting the third processor to perform the write request; and
passing the original instruction to the selected processor to be written into the shared memory location.

8. The method of claim 7 wherein the step of passing the original instruction comprises the steps of:
searching the software memory map for a fifth plurality of processors that have read access to the shared memory location;
broadcasting the write request to the fifth plurality of processors; and
performing cache coherency updates in response to the write request in each of the fifth plurality of processors.

9. The method of claim 8 wherein the step of broadcasting the write request comprises indicating that the write request is intended for maintaining cache coherency as opposed to a normal write request.

10. The method of claim 9 wherein the step of performing comprises using cache coherency capabilities, if any, of a processor in response to the write request intended for maintaining cache coherency.

11. A software development system, comprising:
a memory storage system holding a software development tool program;
a host computer connected to the memory storage system, the host computer operable to execute the software development tool program;
a test port for connecting to a target hardware system, the hardware system being comprised of multiple processors with common shared memory and operable to execute an application program; and
wherein the software development tool is operable to support debugging of the application program executing on the target hardware system using a method for maintaining coherency of software breakpoints in shared memory when debugging a multiple processor system, the method comprising the steps of:
creating a software memory map of the memory usage of a plurality of processors in the system to be debugged;
activating a first debug session associated with a first processor of a plurality of processors and at least a second debug session associated with a second processor of the plurality of processors;
setting a first software breakpoint in a shared memory location in the first debug session such that all debug sessions are notified of the setting of the breakpoint, the step of setting comprising:
searching the software memory map to find a first plurality of processors having read access to the shared memory location;
updating a software representation maintained for software breakpoints for each of the first plurality of processors; and
writing the software breakpoint instruction in the shared memory location; and clearing the first software breakpoint in the shared memory location in the second debug session such that all debug sessions are notified of the clearing of the breakpoint.

12. The software development system of claim 11 wherein the step of writing comprises a method for selecting a processor to execute the write, the method comprising the steps of:
if the first processor associated with the first debug session requesting the setting of the software breakpoint has write access to the shared memory location then
selecting the first processor to perform the write request;
else performing the following steps a–b:
a. searching the software memory map for a second processor with write access to the shared memory location;
b. selecting the second processor to perform the write request; and
passing the software breakpoint instruction to the selected processor to be written into the shared memory location.

13. A digital system, comprising:
multiple processors with common shared memory for executing an application program; and
wherein the application program was developed with a software development system using a method for maintaining coherency of software breakpoints in shared memory when debugging a multiple processor system, the method comprising the steps of:
creating a software memory map of the memory usage of a plurality of processors in the system to be debugged;
activating a first debug session associated with a first processor of a plurality of processors and at least a second debug session associated with a second processor of the plurality of processors;
setting a first software breakpoint in a shared memory location in the first debug session such that all debug sessions are notified of the setting of the breakpoint, the step of setting comprising:
searching the software memory map to find a first plurality, of processors having read access to the shared memory location;
updating a software representation maintained for software breakpoints for each of the first plurality of processors; and
writing the software breakpoint instruction in the shared memory location; and
clearing the first software breakpoint in the shared memory location in the second debug session such that all debug sessions are notified of the clearing of the breakpoint.

14. The digital system of claim 13 wherein the step of writing comprises a method for selecting a processor to execute the write, the method comprising the steps of:
if the first processor associated with the first debug session requesting the setting of the software breakpoint has write access to the shared memory location then
selecting the first processor to perform the write request;
else performing the following steps a–b:
a. searching the software representation of the memory map for a second processor with write access to the shared memory location;
b. selecting the second processor to perform the write request; and
passing the software breakpoint instruction to the selected processor to be written into the shared memory location.

15. A software development system, comprising:
a memory storage system holding a software development tool program;
a host computer connected to the memory storage system, the host computer operable to execute the software development tool program;
a test port for connecting to a target hardware system, the hardware system being comprised of multiple processors with common shared memory and operable to execute an application program; and
wherein the software development tool is operable to support debugging of the application program executing on the target hardware system using a method for maintaining coherency of software breakpoints in shared memory when debugging a multiple processor system, the method comprising the steps of:
creating a software memory map of the memory usage of a plurality of processors in the system to be debugged;
activating a first debug session associated with a first processor of a plurality of processors and at least a second debug session associated with a second processor of the plurality of processors;
setting a first software breakpoint in a shared memory location in the first debug session such that all debug sessions are notified of the setting of the breakpoint; and
clearing the first software breakpoint in the shared memory location in the second debug session such that all debug sessions are notified of the clearing of the breakpoint, the step of clearing comprising:
writing the original instruction stored in a software representation maintained for software breakpoints into the shared memory location;
searching the software memory map to find a fourth plurality of processors having read access to the shared memory location; and
updating a software representation maintained for software breakpoints for each of the fourth plurality of processors to remove the software breakpoint for the shared memory location.

16. The software development system of claim 15 wherein the step of writing comprises a method for selecting a processor to execute the write, the method comprising the steps of:
if the first processor associated with the first debug session requesting the setting of the software breakpoint has write access to the shared memory location then
selecting the first processor to perform the write request;
else performing the following steps a–b:
a. searching the software memory map for a second processor with write access to the shared memory location;
b. selecting the second processor to perform the write request; and
passing the software breakpoint instruction to the selected processor to be written into the shared memory location.

17. A digital system, comprising:

multiple processors with common shared memory for executing an application program; and wherein the application program was developed with a software development system using a method for maintaining coherency of software breakpoints in shared memory when debugging a multiple processor system, the method comprising the steps of:

creating a software memory map of the memory usage of a plurality of processors in the system to be debugged;

activating a first debug session associated with a first processor of a plurality of processors and at least a second debug session associated with a second processor of the plurality of processors;

setting a first software breakpoint in a shared memory location in the first debug session such that all debug sessions are notified of the setting of the breakpoint; and clearing the first software breakpoint in the shared memory location in the second debug session such that all debug sessions are notified of the clearing of the breakpoint, the step of clearing comprising:

writing the original instruction stored in a software representation maintained for software breakpoints into the shared memory location;

searching the software memory map to find a fourth plurality of processors having read access to the shared memory location; and updating a software representation maintained for software breakpoints for each of the fourth plurality of processors to remove the software breakpoint for the shared memory location.

18. The digital system of claim 17 wherein the step of writing comprises a method for selecting a processor to execute the write, the method comprising the steps of:

if the first processor associated with the first debug session requesting the setting of the software breakpoint has write access to the shared memory location then selecting the first processor to perform the write request;

else performing the following steps a–b:

a. searching the software representation of the memory map for a second processor with write access to the shared memory location;

b. selecting the second processor to perform the write request; and passing the software breakpoint instruction to the selected processor to be written into the shared memory location.

* * * * *